United States Patent [19]
Raith et al.

[11] Patent Number: 5,353,332
[45] Date of Patent: Oct. 4, 1994

[54] METHOD AND APPARATUS FOR COMMUNICATION CONTROL IN A RADIOTELEPHONE SYSTEM

[75] Inventors: Alex K. Raith; Walter G. A. Muller, both of Kista, Sweden

[73] Assignee: Ericsson GE Mobile Communications Inc., Research Triangle Park, N.C.

[21] Appl. No.: 955,591

[22] Filed: Oct. 2, 1992

Related U.S. Application Data

[63] Continuation-in-part of Ser. No. 945,468, Sep. 16, 1992.

[51] Int. Cl.$^5$ .......................................... H04M 11/00
[52] U.S. Cl. ...................................... 379/59; 379/60; 455/33.2; 455/56.1
[58] Field of Search .................... 379/58, 59, 60; 455/33.1–33.4, 34.1, 34.2, 54.1, 56.1, 62, 65, 226.2, 226.3

[56] References Cited

U.S. PATENT DOCUMENTS

| | | | |
|---|---|---|---|
| 4,850,033 | 7/1989 | Eizenhöfer et al. | 455/56.1 |
| 4,876,738 | 10/1989 | Selby | 455/56.1 |
| 5,093,926 | 3/1992 | Sasuta | 455/56.1 |
| 5,239,667 | 8/1993 | Kanai | 379/60 |

OTHER PUBLICATIONS

Idle Mode Cell Selection for Hierarchcial Cell Structures, ETSI STC SMG2 ad hoc Meeting, Taastrup, Aug. 17, 1992.
Idle Mode Cell Reselection for Microcells, ETSI GSM2, Ronneby Sep. 17–20, 1991.
Use of Umbrella Cells in Idle Mode, ETSI SMG2, Turin May 5–8, 1992.

*Primary Examiner*—Curtis Kuntz
*Assistant Examiner*—Dwayne D. Bost
*Attorney, Agent, or Firm*—Burns, Doane, Swecker & Mathis

[57] ABSTRACT

In a radiotelephone system, the control channel of each cell can be configured to broadcast absolute information about its cell and relative information about other cells including the characteristic of the cell. Further, the location of other control channels may also be included among the information broadcast over a control channel of a particular cell. This information is then used to lock a mobile unit to a preferred cell.

14 Claims, 4 Drawing Sheets

CONTROL CHANNEL

METHOD AND APPARATUS FOR COMMUNICATION CONTROL IN A RADIOTELEPHONE SYSTEM

This a continuation-in-part application of U.S. patent application Ser. No. 945,468, filed Sep. 16, 1992 and entitled "Communication Control Technique for a Radiotelephone System".

BACKGROUND

The present invention relates to a control technique for a radiotelephone communication system, and more particularly, to a control technique for a wireless communication system.

Continuing growth in telecommunications is placing increasing stress on the capacity of cellular systems. The limited frequency spectrum made available for cellular communications demands cellular systems having increased network capacity and adaptability to various communications traffic situations. Although the introduction of digital cellular systems has increased potential system capacity, these increases alone may be insufficient to satisfy added demand for capacity and radio coverage. Other measures to increase system capacity, such as decreasing the size of cells in metropolitan areas, may be necessary to meet growing demand.

Interference between communications in cells located near one another creates additional problems, particularly when relatively small cells are utilized. Thus, techniques are necessary for minimizing interference between cells. One known technique is to group cells into "clusters". Within individual clusters, communication frequencies are allocated to particular cells in a manner which attempts to maximize the uniform distance between cells in different clusters which use the same communication frequencies. This distance may be termed the "frequency reuse" distance. As this distances increases, the interference between a cell using a communication frequency and a distant cell using that same frequency is reduced.

Radio base stations are often located near the center of each cell to provide radio coverage throughout the area of the cell. Alternatively, a radio base station may be located near the center of three adjacent "sector cells" to cover those cells. The choice between a sectorized and non-sectorized system is based on various economical considerations such as equipment costs for each base station.

Localized microcells and picocells may be established within overlying macrocells to handle areas with relatively dense concentrations of mobile users, sometimes referred to as "hot spots". Typically, microcells may be established for thoroughfares such as crossroads or streets, and a series of microcells may provide coverage of major traffic arteries such as highways. Microcells may also be assigned to large buildings, airports and shopping malls. Picocells are similar to microcells, but normally cover an office corridor or a floor of a high-rise building. The term "microcells" is used in this application to denote both microcells and picocells, and the term "macrocells" is used to denote the outermost layer of a cellular structure. An "umbrella cell" can be a macrocell or a microcell as long as there is a cell underlying the umbrella cell. Microcells allow additional communication channels to be located in the vicinity of actual need, thereby increasing overall system capacity while maintaining low levels of interference.

The design of future cellular systems will likely incorporate macrocells, indoor microcells, outdoor microcells, public microcells and restricted microcells. Macrocell umbrella sites typically cover radii in excess of one kilometer and serve rapidly moving users, for example, people in automobiles. Microcell sites are usually low power, small radio base stations, which primarily handle slow moving users, such as pedestrians. Each microcell site can be viewed as an extended base station which is connected to a macrocell site through digital radio transmission or optical fibers.

In designing a microcell cluster, it is necessary to allocate spectrum to the microcells. This can be done in several ways; for example, microcells can reuse spectrum from distant macrocells; a portion of the available spectrum may be dedicated for microcell use only; or a microcell can borrow spectrum from an umbrella macrocell.

In dedicating spectrum to the microcells, a portion of the available spectrum is reserved strictly for the microcells. Borrowing spectrum involves taking frequencies available to the macrocell for microcell use.

Each of these channel allocation methods has accompanying advantages and drawbacks. Reusing channels from distant macrocells causes little reduction in capacity of the macrocell structure. However, reuse is not always feasible because of co-channel interference between the microcells and macrocells.

By dedicating spectrum to the microcell, interference between cell layers (microcell and macrocell) is reduced because any m-channel interference is between microcells, not between macrocells and microcells. When dedicating spectrum to a microcell, that spectrum is taken from the entire macrocell system in a certain area, for example a city. Thus, that spectrum is not available for macrocell use. As a result, in an area containing only a few microcells, capacity is adversely affected because the microcells cover only a small portion of the area in the macrocell area while the macrocell, with a reduced amount of spectrum available, must cover a substantial area. Nevertheless, as the number of microcells increases and the area covered by only the macrocell decreases, capacity problems associated with dedicating spectrum may be reduced and a total net gain in overall system capacity is achieved without introducing blocking in the macrocells.

Borrowing channels from an umbrella macrocell, like reuse, presents potential co-channel interference between microcells and macrocells. Also, capacity may be adversely affected because efficient spectrum allocation is often impossible. For example, it may be difficult to address all the hot spots in a cell simultaneously when borrowing or dedicating spectrum. An advantage of borrowing spectrum is that the entire macrocell system is not affected, unlike dedicating spectrum, because only spectrum allocated to a covering macrocell is borrowed and not spectrum from the entire system. Thus, other macrocells can use the same spectrum which is being borrowed by a microcell frown its covering macrocell.

Further, in cluster design, allocated spectrum must be distributed to individual microcell sites. Known methods employed for spectrum allocation include fixed frequency planning, dynamic channel allocation (DCA), and adaptive channel allocation (ACA). Further, a control channel management technique must be selected. One possibility includes having each cell or sector in a sectorized system use a unique control channel until frequency reuse is feasible from an interference point of view.

With the introduction of microcells, radio network planning may increase in complexity. The planning process is largely dependent upon the structure of the microcells. For example, the size of streets, shopping malls, and buildings are key design criteria. Microcells suffer from a series of problems including an increased sensitivity to traffic variations, interference between microcells, and difficulty in anticipating traffic intensities. Even if a fixed radiotelephone communication system could be successfully planned, a change in system parameters such as adding a new base station to accommodate increased traffic demand may require replanning the entire system. For these reasons, the introduction of microcells benefits from a system in which channel assignment is adaptive both to traffic conditions and to interference conditions.

One of the main concerns associated with microcells is the minimization of frequency planning in FDMA and TDMA systems or power planning in a CDMA system. Radio propagation which is dependent on environmental considerations (e.g., terrain and land surface irregularities) and interference are difficult to predict in a microcellular environment, thereby making frequency or power planning extremely difficult if not impossible. One solution is to use an adaptive channel allocation (ACA) scheme which does not require a fixed frequency plan. According to one implementation of this method, each cell site can use any channel in the system when assigning a radio channel to a call. Channels are allocated to calls in real time depending on the existing traffic situation and the existing interference situation. Such a system, however, may be expensive since more channel units on the average must be installed.

Several advantages are realized with ACA. There is almost no trunking efficiency loss since each cell can use any channel. Thus, it is possible to employ cells with very few channels without losing network efficiency. Further, channel reuse is governed by average interference conditions as opposed to the worst-case scenario.

Several ACA schemes attempt to improve traffic capacity and avoid the need for frequency planning. While some systems have been moderately effective in accomplishing these goals, it has been difficult to achieve both goals in a system which has preassigned control channels, i.e., a system having specified frequencies on which a mobile station may expect a control channel (a 30 KHz RF channel which contains control signals). Systems having preassigned control channels include AMPS (Advanced Mobile Phone Service System), IS-54 (Revision B) and TACS (Total Access Communication System). In such systems, frequency planning is still needed for control channels. However, frequency planning for voice channels can be avoided and traffic capacity improved by eliminating the need to plan a number of voice channels on each site in an area where traffic channels are expected to be non-uniformly distributed.

When planning an antenna system, allocating spectrum for a microcell cluster, and selecting a power level for microcell transmitting power, several concerns must be addressed. Sufficient radio coverage, e.g., 98%, must be provided within the microcell area. Also, if the spectrum allocated to the microcell cluster has been reused from a distant macrocell, the power level of the microcells must be low enough to avoid interference with the distant macrocell from which the spectrum was reused. Further, the power of the control channel in the microcell may have to be stronger than the power of the covering umbrella macrocell control channel if the mobile is to lock on to the microcell. In sum, the aim of such a system is to assign as many mobiles as possible to microcell control channels by maintaining those control channels stronger than the control channels of the umbrella macrocell in the intended microcell area while transmitting with a sufficiently low power to avoid interference with the distant macrocell.

Power or interference limitations can result in a voice channel limited system where some of the mobiles in the microcells will receive a stronger signal from an overlying macrocell. The number of mobiles receiving a stronger signal from an overlying macrocell will increase as the distance between the umbrella cell and the microcell decreases. Consequently, capacity might not increase since mobiles are locked-on to the macrocell. Moreover, if mobile transmitting power requirements increase, the battery life of the current portables would correspondingly decrease to maintain the equivalent level of performance. Further, blocking and intermodulation may arise with high powered mobiles located inside the microcell area. The high-powered mobiles are power controlled by the umbrella macrocell and require more power to communicate with the umbrella macrocell than the microcell.

SUMMARY

A control channel management scheme implemented according to the present invention may include a variety of different cells. To facilitate locking or camping mobile units to the most appropriate cell, the control channel of each cell can be configured to broadcast information about other cells including the characteristics of the cells such as cell type. Further, the location in frequency and time of other control channels may also be included among the information broadcast over a control channel of a particular cell. This information is then used by the mobile to lock to a preferred cell. Locking is the selecting of a cell such that a mobile reads all messages and is prepared to receive pages and make calls. Thus, once a mobile is locked to a particular cell, it may make and receive calls.

Based on the control information found on a control channel, the mobile attempts to find the best server, i.e., the best cell, based on both the mobile and system requirements. For example, according to one embodiment, the best server is the one which requires the mobile to transmit with the least amount of power. In another embodiment, the goal may be to minimize the charge of a call to a customer, thus the cell which provides the lowest cost service to the mobile may be selected. A variety of criteria may be used to determine a preferred cell, and all such criteria are considered within the scope of this invention. In general, the preferred cell is determined by the system requirements and goals.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Although the following description is in the context of cellular communication systems involving portable or mobile radio telephones and/or personal communication networks, it will be understood by those skilled in the art that the present invention may be applied to other communication systems.

Figure 1:
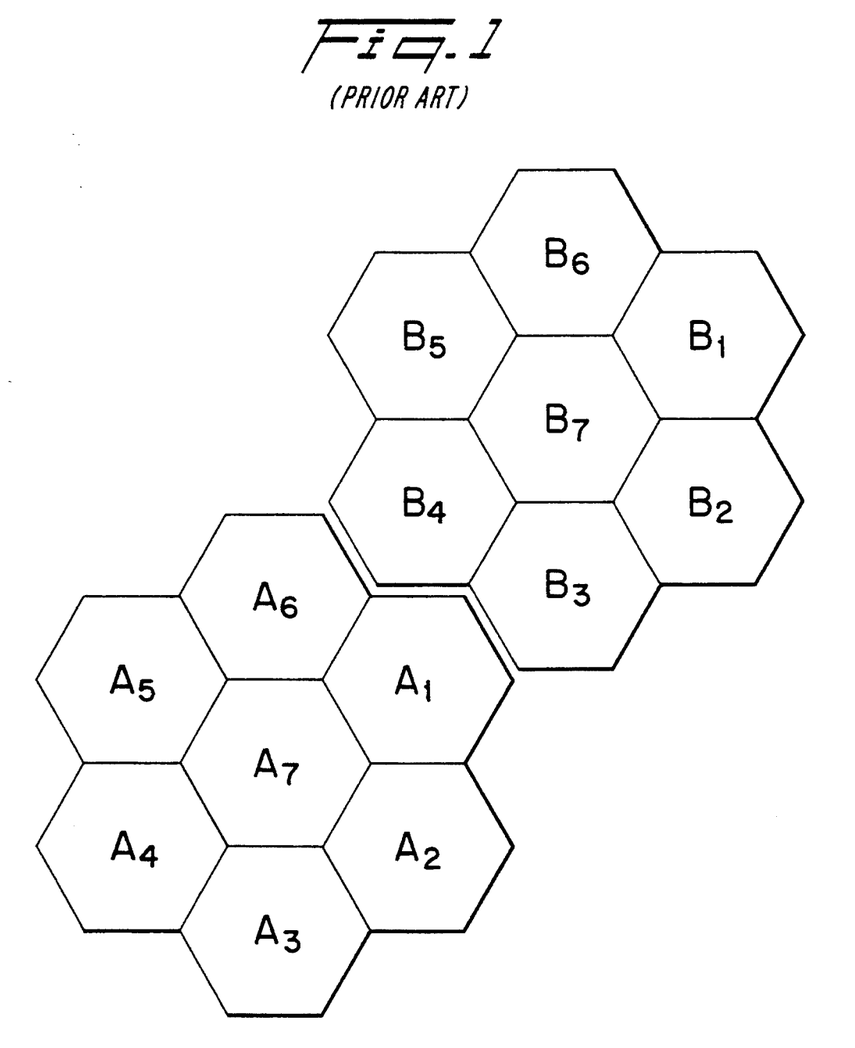
FIG. 1 is a cell plan illustrating two cell clusters in a cellular mobile radiotelephone system.

FIG. 1 illustrates a first cell cluster A and a second cell cluster B forming pan of a cellular mobile radio telephone system in a known manner. Such a system is described in U.S. patent application Ser. No. 07/604,522 entitled "A Method and Apparatus For Enhancing Signalling Reliability in a Cellular Mobile Radio Telephone System" by Ghisler et al. which is incorporated herein by reference. Typically, all frequencies available in a system are used in each cell cluster. Within each cell cluster, the frequencies are allocated to different cells to achieve the greatest uniform distance, known as the frequency reuse distance, between cells in different clusters using the same frequency. In FIG. 1, cells $A_1$ and $B_1$ use a common frequency, cells $A_2$ and $B_2$ use a common frequency, cells $A_3$ and $B_3$ use a common frequency, etc. The radio channels in cells $A_1$ and $B_1$ using the same frequency are referred to as co-channels because they share the same frequency. Although some interference will occur between co-channels, the level of such interference in an arrangement such as that of FIG. 1 is normally acceptable. The cell plan of FIG. 1 allows for a relatively simple frequency allocation and provides reduced co-channel interference in low traffic conditions. However, as noted above, limitations in high traffic areas restrict the use of this cell plan. For example, traffic in hot spots can produce blocking.

Future systems may not require the type of frequency planning associated with the cell structure of FIG. 1. For example, a CDMA (code division multiple access) system may have very different assignment techniques and may not require frequency planning. However, transmitter power planning may be a concern instead. Also, in a CDMA system channels may not need to be reused as described with reference to FIG. 1. A CDMA system is shown in copending U.S. Pat. No. 5,151,919 and U.S. patent application Ser. No. 07/739,446 both entitled "CDMA Subtractive Demodulation" which are herein incorporated by reference. In non-CDMA systems techniques such as ACA may be used so that strict frequency planning is not necessary, in particular pre-planning, i.e., planning without knowledge of instantaneous conditions including traffic patterns and interference distribution.

Figure 2:
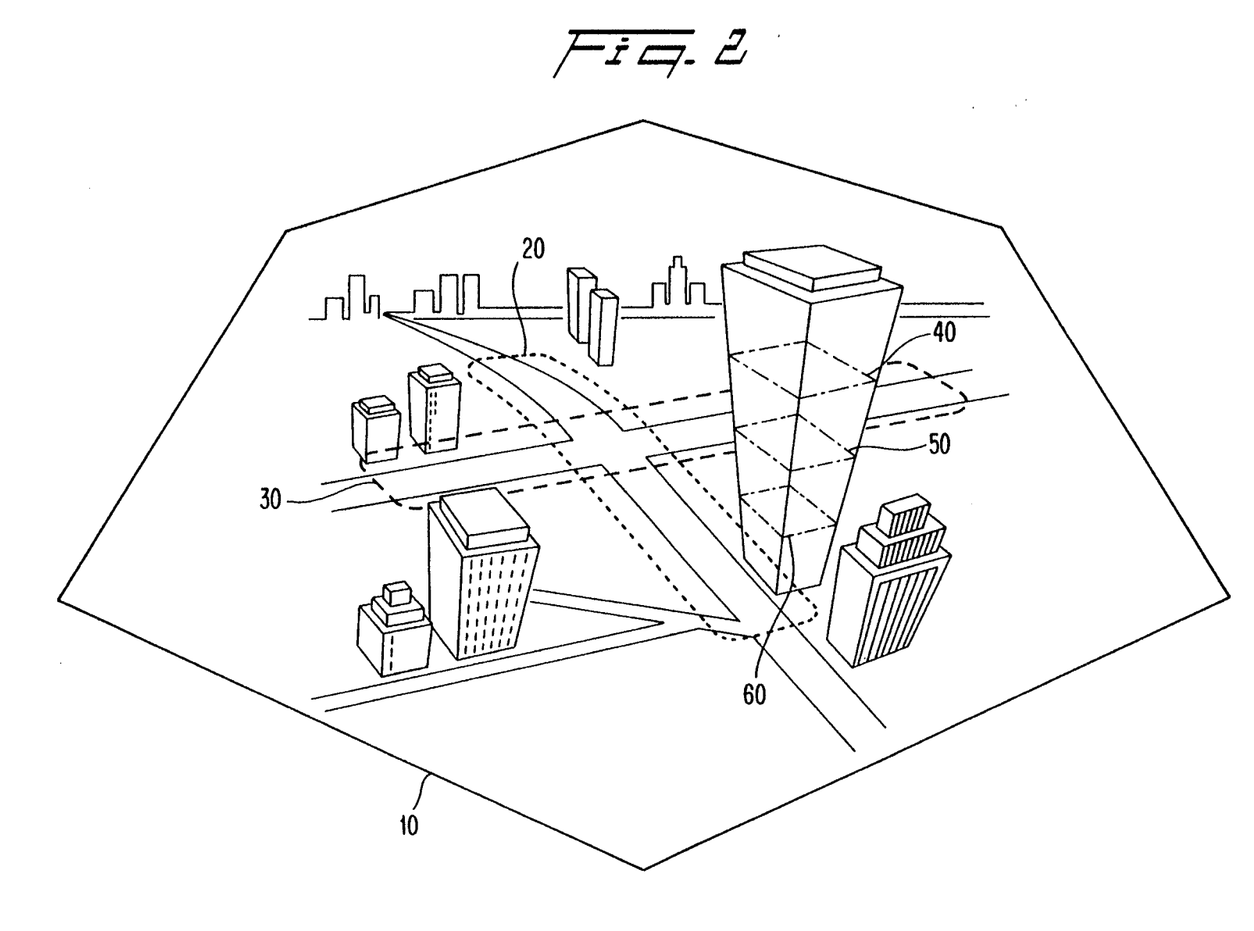
FIG. 2 illustrates an exemplary multi-layered cellular system employing umbrella macrocells, microcells and picocells.

FIG. 2 is an exemplary multi-layered cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and microcells 40, 50, and 60, which cover individual floors of a building. The intersection of the two city streets covered by the microcells 30 and 40 may be an area of dense traffic concentration, and thus might represent a hot spot.

Briefly, control channels are used for setting up calls, informing the base stations about locations and parameters associated with mobile stations, and informing the mobile stations about locations and parameters associated with the base stations. The microcell base stations listen for call access requests by mobile stations and the mobile stations in turn listen for paging messages. Once a call access message has been received, it must be determined which cell will be responsible for the call.

Future systems will employ additional cells. For example, new systems may include any combination of macrocells, indoor microcells, outdoor microcells, public microcells and restricted or private microcells. New systems therefore will likely be designed to incorporate an increasing number of control channels. Currently, there are approximately twenty-one control channels available for a cluster in a typical system employed in the United States.

According to the present invention, each control channel in each cell is configured to broadcast information about the presence, if any, of other cells and the characteristics of those cells including minimum quality criteria, power requirements, etc. Typically, information about the presence of other cells is broadcast about neighboring cells. For instance, a neighboring cell may be adjacent to, overlapping, or non-contiguous from the broadcasting cell. A mobile periodically scans during idle mode the control channels in the coverage area that the mobile is located in to determine which cell it should be locked to. Thus, a mobile may continuously select cells to be locked to based on the existing location of the mobile and quality criteria (e.g., received signal strength) associated with the cells. The cell to which the mobile may be locked is the cell in which the mobile satisfies the quality criteria associated with the cell. For example, the most underlying cell based on capacity considerations may be preferred by the mobile.

Two types of information are broadcast over the control channel according to the present invention: "absolute information" and "relative information". Absolute information includes information about the particular cell corresponding to the control channel on which the information is being broadcast. This information might include the service profile of that cell, the control channel organization, and/or the type of cell (for example restricted or unrestricted). An unrestricted cell is a cell which is available to all users at all times and a restricted cell is the opposite. Relative information is generally the same kind of information as absolute information, but is information concerning the characteristics of other cells.

It is important for the mobile constantly to be locked to a preferred cell. Specifically, the mobile may be paged at any time, therefore the mobile must be locked to a particular cell in a location area so that the mobile may receive the page. For example, if the mobile has moved out of the location area of a first cell to which the mobile was locked to a second cell in a different location area, a paging request for the mobile will not be heard or received because the mobile switching center, or MSC, will page the mobile over a paging channel available to the location area in which the mobile is registered. Thus, a paging request would not be received by the mobile in the distant location area if it is not registered in that location area. Therefore, the mobile should register with a new base station when entering a new location area. Location areas typically include a large group of adjacent cells. It would be inefficient and impractical to instruct all location areas to page the mobile.

A mobile may register with one base station in a location area. A location area is typically a group of contiguous cells which do not necessarily have the same area of radio coverage. For example, with respect to FIG. 2, microcells 20, 30, 40, 50 and 60 may define one location area.

In an exemplary system including a public umbrella cell, public microcell, and a private microcell, i.e., a microcell accessible to a closed user group at all times like a home base station or a campus system, all may provide sufficient radio coverage for the mobile to access or for the mobile to receive a page. A mobile may be locked to an appropriate cell based on both information found on an umbrella cell control channel which contains information about the underlying cells and information on each microcell control channel about any overlying cells. In sum, information can be broadcast over control channels to the mobiles about the presence of other overlying or underlying cell structures, the attributes of those cell structures and where to find those cell structures.

When selecting the appropriate cell, a mobile can lock on to a candidate control channel and find all the absolute information about the cell associated with that control channel to determine if the cell is appropriate. Alternatively, the mobile can find the same information in the form of relative information by reading messages present on any nearby cells and their control channels.

If a mobile determines that more than one cell meets minimum requirements, for example signal link quality, access restriction, service profiles, etc., the mobile can scan all or a subset of all control channels and then make the best selection. For example, the mobile may choose to lock on to a cell which does not require an equalizer to be used, or a private cell like a home base station. Typically, small cells do not require an equalizer. Radio propagation and bit rate conditions determine whether an equalizer is needed.

Table 1 lists some of the attributes of a cell which may be included in the information on a particular control channel. One cell may have more than one control channel, in which case the absolute and relative information on the several control channels of the cell typically are the same. Some or all information about a control channel can be transmitted on other control channels on cells that are "close" to the control channel of interest. Typically, "close" will include contiguous cells which may have the same area of radio coverage. For example, with reference to FIG. 2, a control channel of microcell 30 may broadcast information concerning cells 10, 20, 40, 50 and 60.

In Table 1, the first column represents the type of information about a cell and a control channel which can be broadcast on a control channel. A "Y" in column 2 indicates that the information may be useful if it is about the present control channel to which a mobile is tuned and also may be useful if the information concerns other cells and their respective control channels, absolute and relative information. A "Z" in column 2 indicates the information may be useful if about other cells, relative information.

TABLE 1

| INFORMATION | WHERE PRESENT |
|---|---|
| Where to find and decode a control channel; e.g., frequency, time slot identifier, DS-CDMA code, CDMA pilot code, frequency hopping sequence | Z |
| Emergency calls only | Y |
| Minimum mobile station transmission power | Y |
| Maximum mobile station transmission power | Y |
| Equalizer needed/not needed (may save power) | Y |
| "City phone system", may differ from back-bone system regarding power, services, rates, etc. | Y |
| Test cell for operations; may or may not accept emergency calls; special mobiles may access | Y |
| Absolute location area | Y |
| Relative location area (in respect to present cell) | Z |
| Campus system (closed user group); full or abbreviated ID may be sent on other cell | Y |
| Home base station | Y |
| Moving cell (e.g., on buses, trains) | Y |
| Rescue cell for call re-establishment or to quickly find a new cell to lock onto if needed | Z |
| Service profile (e.g., data only, voice, etc.) | Y |
| Air-interface specification revision | Y |
| System owner (full ID) | Y |
| System owner (relative to present cell) | Z |
| Time synchronized control channels (time slot alignment, spreading code alignment, super or hyper frame alignment); one cell (or site) may carry more than one control channel | Z |
| Barred cell - no call set up possible | Y |
| Non-identical cell types present in this radio coverage area (e.g., public/private) | Y |
| Control channel organization, e.g., where to find different paging channels, packet data, etc. | Y |
| Cell selection and re-selection parameters/criteria (e.g., to ensure sufficient radio link quality) | Y |

Figure 3:
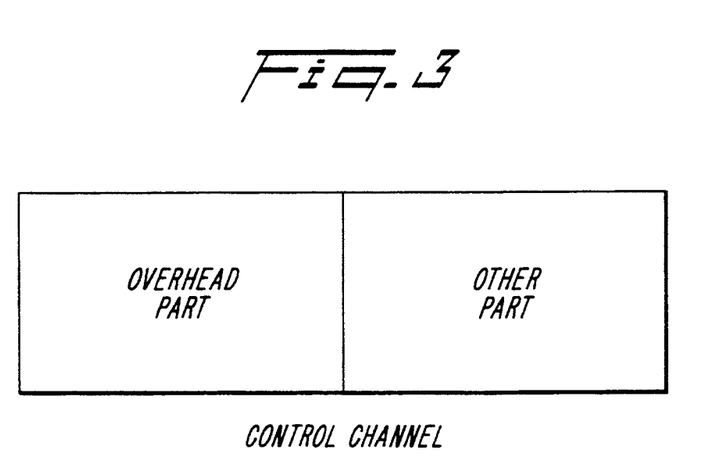
FIG. 3 illustrates an exemplary control channel.

A control channel may be formatted having an "overhead part" and an "other part" as shown in FIG. 3. The overhead part may contain general information about the system like the parameter necessary to be read before a mobile makes an access. Also, the overhead part may contain the information identifying where a particular mobile station will find its paging channel. The "other part" may contain the paging channels and other types of channels. An exemplary control channel organization can be found in U.S. Pat. No. 5,081,704 to Umeda et at., entitled "Method of Arranging Radio Control Channels in Mobile Communications". Thus, control channel organization information may include information such as where in a particular control channel message that overhead information can be found and where a paging channel may be found.

According to an exemplary embodiment of the present invention, a flag indicating that a respective control channel is time synchronized may be added to the location information of other control channels to aid cell reselection when the mobile is in idle mode. The synchronized information may contain time difference information. Time difference information may be in several forms. The actual time difference between the present control channel and the control channel of another candidate cell may be included on the present control channel. For practical purposes, however, the time difference information may include a single bit of information which indicates whether the time difference is zero.

If the two control channels are aligned, for example on a slot, frame, super frame (a collection of TDMA frames), or hyper frame (a collection of super frames), or the time difference is known to the mobile, the mobile can rapidly lock to the candidate control channel (cell) assuming information about where to find and decode that control channel is included on the present control channel. The present invention is not limited to TDMA systems and can be applied to other systems including CDMA. Even if only a limited amount of relative information is broadcast on the control channel for capacity reasons, the time difference information makes the cell selection and reselection process faster which improves system performance. For example, the mobile station may be blind for pages a shorter amount of time. Thus, "dead time" associated with receiving pages while searching is reduced.

Direct Sequence (DS) CDMA codes and CDMA pilot codes may be included as relative information. The DS CDMA code is the PN sequence code for communicating with a particular base station. The pilot code is a short code which is used for synchronizing, and provides information about how to find the PN sequence, i.e., the appropriate phasing and start time.

Some of the information items which can be placed on a control channel are mutually similar, for example, low mobile station power and maximum mobile transmitter power.

Cell selection and reselection criteria may include a path loss criterion parameter which is the difference between the received signal strength and a minimum access threshold signal level. The GSM specification discusses such criteria, but GSM does not employ cell selection and reselection criteria as relative information. Typically, if the path loss criterion parameter is positive then the cell is of acceptable coverage quality. A second parameter can be used in conjunction with the path loss criterion. The second parameter determines priorities in the reselection of suitable cells and is a combination of the path loss criterion and network controlled parameters. The network parameters control the cell selection for a hierarchical cell structure, for example a microcell and macrocell structure where the network operator wants to assign mobiles to a cell other than the cell from which the mobile receives the strongest signal.

The above cell selection and reselection criteria may involve measurement of received signal strengths on respective control channels with absolute or relative parameters sent on the control channels. By comparing the set of measurements and parameters of different control channels, the mobile can select the most appropriate cell. Further, the service profile of a candidate cell may also determine the selection of control channels (cells). Service profile information might include information such as whether a half rate or full rate speech coder is being used; the data bit transmission rate; and the type of data the cell can handle, i.e., data, voice, and data and voice.

To determine the received signal strength of a particular cell, the mobile must go to a control channel of the particular cell in order to measure the received signal strength. Thus, received signal strength is an absolute parameter and cannot be determined relatively. Consequently, if received signal strength is an essential parameter, the mobile must make a final check of the received signal strength on the candidate control channel before locking to a control channel. Relative information can be used to screen the control channels and reduce the list of possible suitable control channels. Thus, the mobile with some type of relative information determines a group of candidate cells which satisfy a particular criterion. Then, the mobile accesses at least one candidate control channel to find a control channel with an acceptable signal strength. Some parameters associated with signal link requirements may be sent as relative information, but some form of absolute information may be necessary.

Control channels often correspond to a cell. However, one cell may have more than one control channel thus the elimination of a control channel as being unsuitable does not necessarily eliminate the cell as a candidate cell.

Location area is another parameter which may be broadcast over the control channel. Location areas are constructed to determine where the mobile is located for paging. Typically, a mobile registers with a new base station when it changes location area.

A variety of cell type information can be provided on a control channel to aid the mobile to lock to a most appropriate cell. For example, some cells are available for particular situations like cells for emergency calls only; moving cells where the moving entity defines the cell like a plane or bus; test cells which are cells an operator may want to test (e.g., because they are being added to the system) and thus are limited to specific mobiles; a home base station which is assigned and accessible to a closed user group, e.g., members of a particular household; rescue cells which are used when the mobile may immediately need a cell, for example to reestablish a call; barred cells where no call set up is possible because of, for example, imminent cell shut down for maintenance purposes; and other public and private cell types. Cell type information can take the form of cell system information. Exemplary cell systems may include a campus system which may be limited to a certain area and a certain user group, and a city phone system which may have different services, costs, and power requirements.

Important considerations when broadcasting the information on the control channel are the system limitations concerning the amount of information which can be broadcast in a message over the control channel, viz., the transmission capacity of the control channel. Consequently, it is generally not feasible or necessary to broadcast all relevant information. Therefore, a tradeoff must be made between the necessary relative information and the control channel capacity. At one extreme, no relative information is sent and the mobile must lock on to all candidate control channels to discover the information for initial cell selection and cell reselection. At the other extreme, a mobile may be able to tune to a single control channel and receive all information necessary to determine a preferred cell. In this scenario, the mobile compares all the information about the nearby cells and selects a preferred cell.

Figure 4:
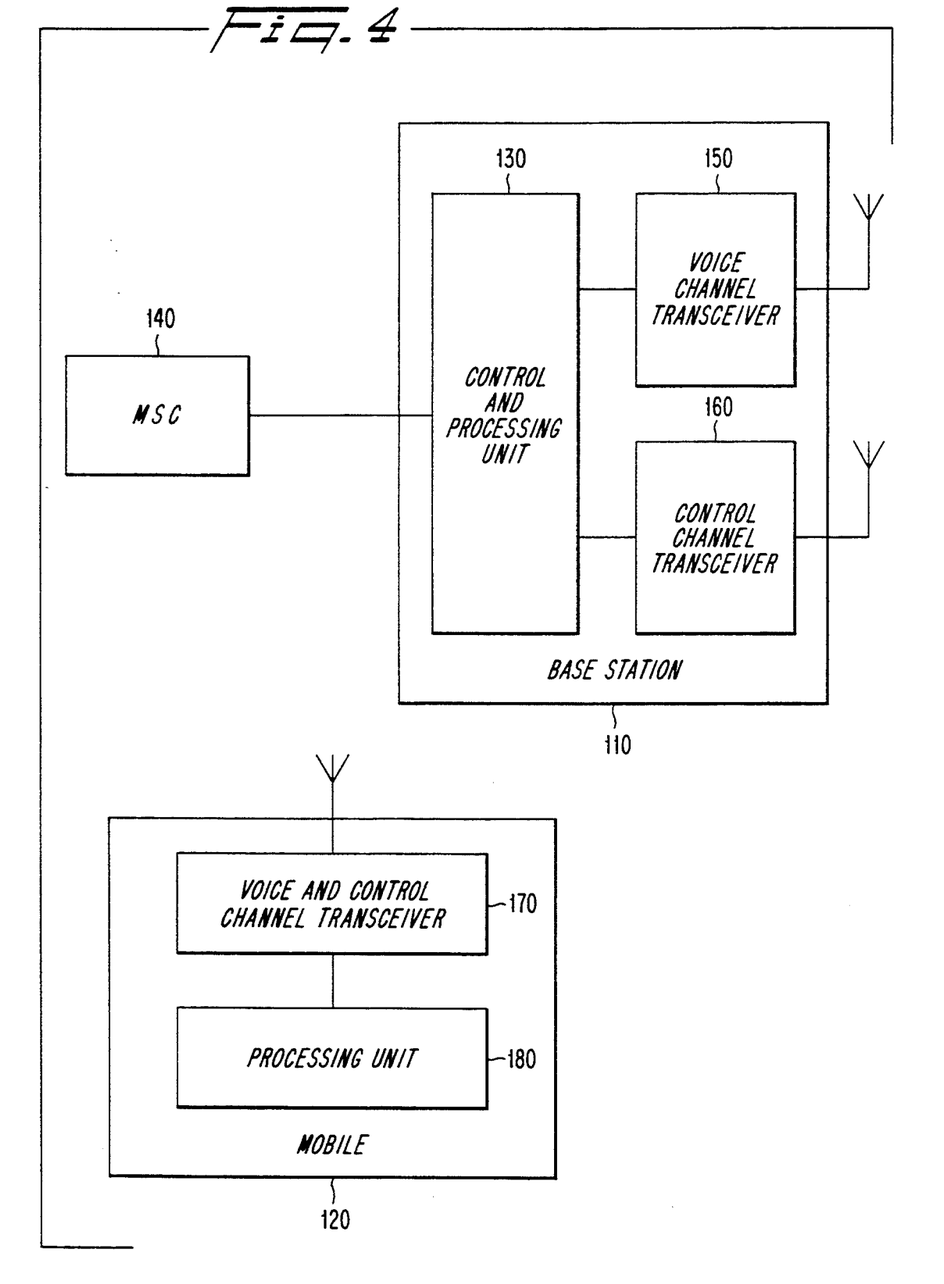
FIG. 4 represents an exemplary implementation of an apparatus for a radiotelephone system according to the present invention.

According to the present invention, base stations may be equipped to handle several voice channels and typically at least one control channel. It is however conceivable that a cell may not have a control channel, but is used only for handoff purposes. Thus, a call is not originated on a cell without a control channel. FIG. 4 represents a block diagram of an exemplary cellular mobile radiotelephone system according to one embodiment of the present inventions. The system shows an exemplary base station 110 and a mobile 120. The base station includes a control and processing unit 130 which is connected to the MSC 140 which in turn is connected to the public switched telephone network (not shown). General aspects of such cellular radiotelephone systems are known in the art. An exemplary system can be found in allowed U.S. patent application Ser. No. 07/670,237 entitled "Neighbor-Assisted Handoff in a Cellular Communication System" by Wejke et al. which is incorporated herein by reference.

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel.

When the mobile 120 is in idle mode, it periodically scans the control channels of base stations like base station 110 to determine which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. The types of information which may be present on the control channel are shown in previously discussed Table 1.

Existing mobile units can limit the flexibility in designing control channel schemes. For example, the practical power capacity of mobile units are currently limited by the size of the units and the characteristics of the energy sources. It is expected that the present invention will be an important part of future mobile units which will easily implement many more of the invention's aspects.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for using control channels in a wireless communications system including a mobile station and a plurality of cells, each cell having a respective control channel, the method comprising the steps of:
   in a first cell, broadcasting relative information about at least one other cell on the first cell's control channel, wherein the relative information concerns the characteristics of the at least one other cell; and
   in the mobile station, analyzing the relative information and locking onto the at least one other cell based on the relative information.

2. The method of claim 1, wherein said relative information includes at least one of cell type information, service profile, equalizer information, time synchronization information, control channel organization information, CDMA pilot code, and cell selection and reselection criteria.

3. The method of claim 1, wherein the relative information includes a flag indicating whether the at least one other cell's control channel is time-synchronized with the first cell's control channel and information indicating a time difference between the at least one other cell's control channel and the first cell's control channel.

4. The method of claim 1 wherein said relative information includes cell type information.

5. The method of claim 4 wherein said cell type information indicates that the at least one other cell is a restricted cell.

6. A method for using control channels in a wireless communications system including a mobile station and a plurality of cells, each cell having a respective control channel, the method comprising the steps of:
   broadcasting first control information on a first control channel associated with a first cell, the first control information including relative information pertaining to a second cell;
   broadcasting second control information on a second control channel associated with a second cell, the second control information including relative information pertaining to the first cell; and
   in the mobile station, comparing said first control information and said second control information and locking onto the second cell based on the comparison of relative information.

7. The method of claim 6, wherein the relative information includes a flag indicating whether a second control channel in use in the second cell is time-synchronized with the first control channel and information indicating a time difference between the second control channel and the first control channel.

8. The method of claim 6 wherein the relative information in said first control information and the relative information in said second control information include received signal strength values.

9. A method in a mobile station for using control channels in a wireless communications system including a plurality of cells, the method comprising the steps of:
   receiving control information on a control channel associated with a first cell, the control information including relative information concerning a second cell, wherein the relative information concerns the characteristics of the second cell; and
   locking to one of the first cell and the second cell based on the control information.

10. The method of claim 9 wherein the control information includes received signal strength values for the first cell and the second cell.

11. A method for using control channels in a wireless communication system including a plurality of cells, said method comprising the steps of:
   broadcasting absolute information about a cell on a control channel of said cell; and
   broadcasting relative information about at least one other cell on said control channel, wherein said absolute information and said relative information each include at least one of cell type information, service profile, control channel organization information, equalizer information, and cell selection and reselection criteria.

12. An apparatus for use with control channels in a wireless communications system including at least one mobile station and a plurality of cells, each cell having a respective control channel, said apparatus comprising:
   means for broadcasting first control information including first relative information on a first control channel associated with a first cell, the first relative information pertaining to a second cell;

means for broadcasting second control information on a second control channel associated with the second cell, the second control information including second relative information pertaining to the first cell; and means, provided in a mobile station, for comparing said first control information and said second control information to determine a preferred cell based on the first and second relative information and for locking onto the preferred cell.

13. The apparatus of claim 12, wherein said second control information includes absolute information pertaining to the second cell.

14. The apparatus of claim 13 wherein said absolute information and said first relative information each include at least one of cell type information, equalizer requirements, service profile, control channel organization information, equalizer information, CDMA pilot code, and time synchronization information.

* * * * *